US012736656B1

(12) United States Patent
Lee

(10) Patent No.: US 12,736,656 B1
(45) Date of Patent: Sep. 15, 2026

(54) RADAR VELOCITY DETERMINATION

(71) Applicant: Zoox, Inc., Foster City, CA (US)

(72) Inventor: Vincent Chee-Chin Lee, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 355 days.

(21) Appl. No.: 18/228,610

(22) Filed: Jul. 31, 2023

(51) Int. Cl.
*G01S 13/58* (2006.01)
*G01S 7/35* (2006.01)
*G01S 13/931* (2020.01)

(52) U.S. Cl.
CPC ............ *G01S 13/581* (2013.01); *G01S 7/354* (2013.01); *G01S 13/931* (2013.01)

(58) Field of Classification Search
CPC ....... G01S 13/581; G01S 7/354; G01S 13/931
See application file for complete search history.

(56) References Cited

U.S. PATENT DOCUMENTS

| | | | | |
|---|---|---|---|---|
| 2019/0377062 | A1* | 12/2019 | Barkan | G01S 13/536 |
| 2019/0391250 | A1* | 12/2019 | Cohen | G01S 13/87 |
| 2021/0237761 | A1* | 8/2021 | Das | G01S 13/867 |
| 2022/0153297 | A1* | 5/2022 | Chen | G01S 17/34 |
| 2022/0244373 | A1* | 8/2022 | Lessmann | G01S 7/356 |

* cited by examiner

*Primary Examiner* — Nazra Nur Waheed
(74) *Attorney, Agent, or Firm* — Lee & Hayes, P.C.

(57) ABSTRACT

Techniques for determining an object velocity associated with a radar device are discussed herein. A computing device can implement a model that receives radar data from the radar device as input and identifies a Doppler interval for determining candidate correction values. The model can select one of the candidate correction values for processing when determining the object velocity. For example, the model can determine a Doppler velocity for output by a radar device based on the selected correction value. The object velocity can be used by a vehicle computing device for predicting vehicle actions to control a vehicle.

21 Claims, 7 Drawing Sheets

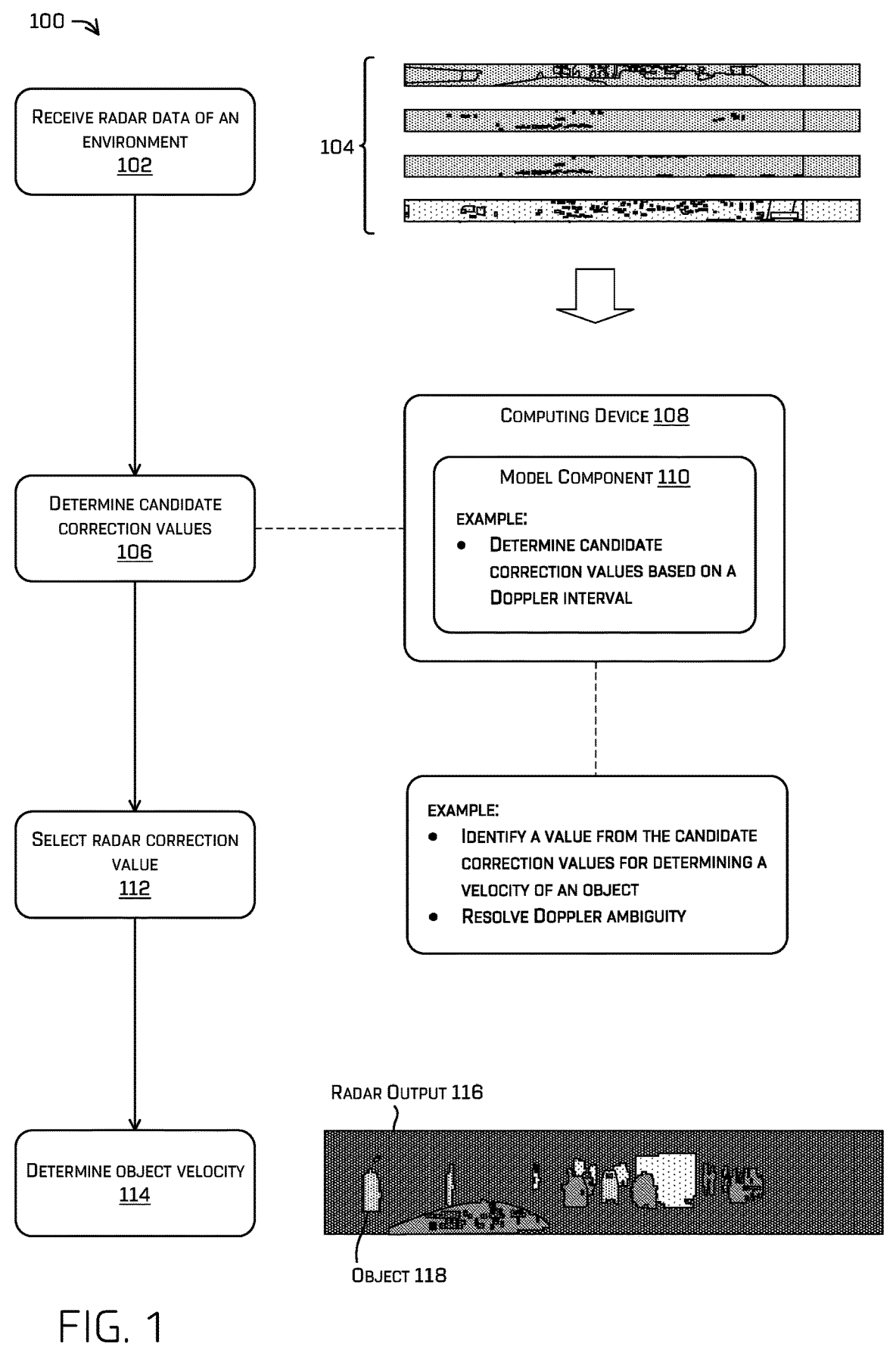

100

RECEIVE RADAR DATA OF AN ENVIRONMENT 102

104

DETERMINE CANDIDATE CORRECTION VALUES 106

COMPUTING DEVICE 108

MODEL COMPONENT 110

EXAMPLE:
- DETERMINE CANDIDATE CORRECTION VALUES BASED ON A DOPPLER INTERVAL

SELECT RADAR CORRECTION VALUE 112

EXAMPLE:
- IDENTIFY A VALUE FROM THE CANDIDATE CORRECTION VALUES FOR DETERMINING A VELOCITY OF AN OBJECT
- RESOLVE DOPPLER AMBIGUITY

DETERMINE OBJECT VELOCITY 114

RADAR OUTPUT 116

OBJECT 118

FIG. 1

RADAR VELOCITY DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle. A radar system can process return data from a pulse emitted from the radar system and incorrectly compensate for a Doppler effect associated with the return data. The radar system can send the inaccurate data to downstream systems thereby causing the inaccurate Doppler effect compensation to generate errors into future determinations by the downstream systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a pictorial flow diagram of an example process for determining an object velocity based on example radar data.

DETAILED DESCRIPTION

Figure 2:
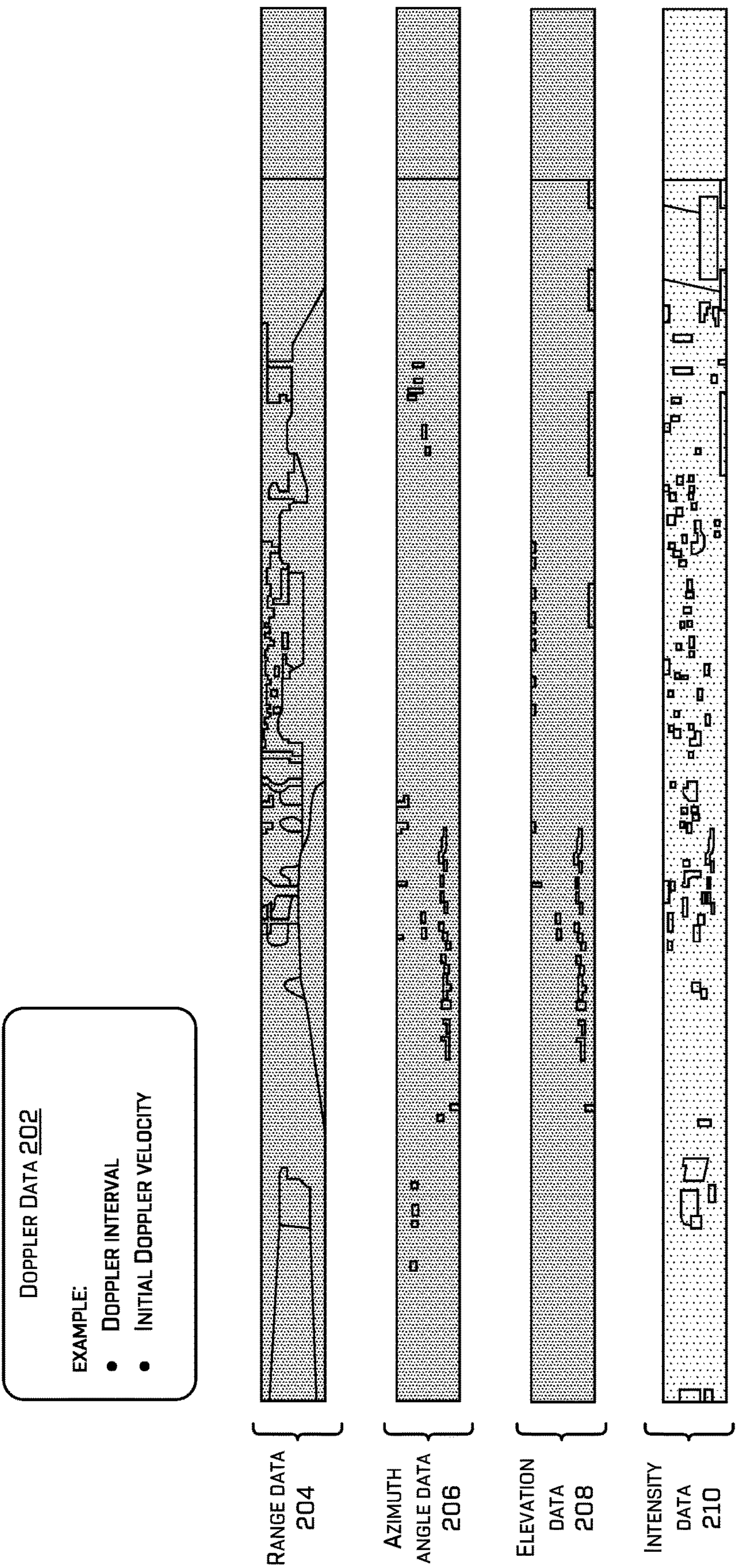
FIG. 2 is an illustration of example input data for a model implementing the techniques described herein.

Techniques for determining an object velocity associated with a radar device are discussed herein. Such velocity determination techniques can be used in a vehicle safety system that detects objects in an environment and validates and/or controls operation of a vehicle, such as an autonomous vehicle. For instance, a model can receive radar data from a radar device as input and implement an algorithm to output a Doppler velocity for an object proximate the vehicle. In various examples, the Doppler velocity can be determined without the model receiving input data from another sensor modality. The Doppler velocity output by the model can be sent to a vehicle computing device that performs perception and/or planning operations to detect and/or avoid objects in the environment. Using the techniques described herein, a vehicle may receive Doppler velocity information from a model usable by the vehicle to quickly and/or preemptively avoid objects, thereby improving safety of the vehicle.

Generally, the model may provide functionality to reduce Doppler ambiguity associated with radar data (e.g., incorrect velocity estimations leading to a false positive or false negative detection). By way of example and not limitation, a radar device can provide radar data to a model that is configured to analyze the radar data to identify a Doppler interval (e.g. a predetermined velocity adjustment value). The model can, for example, determine a set of candidate values based on the Doppler interval that represent possible object velocities for output by the radar device. In some examples, the model can select a value from the set of candidate values as the Doppler velocity or for adjusting an initial velocity measurement to determine the Doppler velocity. By implementing the techniques described herein, more accurate object velocities can be provided to a component for further processing such as by a perception component configured to perform object detection, segmentation, and/or classification. In some examples, an output from the model can be used by a planning component for determining an action by a vehicle to avoid the object, such as determining a vehicle trajectory for the vehicle to follow in the environment.

The techniques can, for example, reduce Doppler ambiguity using the Doppler interval independent of requiring a reference velocity from another modality as input. For example, the model can receive radar data and determine candidate values representing potential velocities for output by the radar device. In some examples, a radar device can report velocities for multiple observations or objects as an offset from a velocity that is a multiple of a Doppler interval associated with a scan that includes the multiple observations or objects. If differences of velocities between observations or objects exceeds a Doppler interval associated with a scan, then the velocities may be reported incorrectly. For example, if a Doppler interval corresponds to 10 m/s, then observations may be reported as an offset between 0-9.9 m/s from an interval of 10 m/s (e.g., 20 m/s). In this example (having a baseline velocity of 20 m/s and a doppler Interval of 10 m/s), if the scan includes two observations at 12 m/s and 32 m/s, then their corresponding offsets may be −8.0 m/s and +2 m/s and thus the 32 m/s speed will be incorrectly interpreted as 22 m/s resulting in a Doppler ambiguity.

In some examples, the model can receive radar data representing different radar devices, or scans of an environment at various frequencies and the model can identify Doppler information (e.g., a Doppler interval for each, or frequency, associated with the radar data). Thus, the model can identify multiple Doppler intervals for different Whether the radar data is associated with a single or multiple different radar devices, the model can be configured to apply one or more algorithms to the(s). For instance, the model can identify a variance among data points in which may represent an error caused by a Doppler effect. The variance (or error) can be compared to another variance (or error) of another observation and/or to a variance threshold, and the model can select the estimated velocity associated with the observation having the smallest error as the Doppler velocity.

As mentioned, the model can apply a variety of different algorithms which can include one or more of: a standard deviation, a mean, an average mean, a root mean square error, or a rigid body estimation algorithm. In some examples, the model can receive radar data that identifies one or more objects in an environment of a radar device. The radar device can be coupled to an autonomous vehicle that is navigating in an environment, for instance, and the techniques can be used to improve velocity predictions for the object(s) in the environment by a safety system that implements the model to receive the radar data. The radar data can include predictions of which data points (radar points detected during a scan) are related (based on a grouping or clustering algorithm) and can include clustered points, a bounding box, or other representation that identifies some of the data points as being associated with a same object (e.g., a static object and/or dynamic object) in the environment. Thus, the radar data can include clustered or grouped data point information usable by the model to determine a velocity for the clustered or grouped data points.

In examples when relatively velocities between observations vary greatly, they may exceed a Doppler velocity associated with scanning for one or more of the observations resulting in an ambiguity in returned Doppler velocities. Using the techniques described herein, the autonomous vehicle can implement a model to process the radar data to provide improved object velocity estimations versus not implementing the model that may not or ineffectively compensate for Doppler velocity ambiguities.

In some examples, the model can identify or filter radar data associated with azimuth bounds (e.g., azimuth angle maximum, azimuth angle minimum, azimuth angle range, a minimum number of observations, etc.), or some other input criteria, and further process the identified radar data. For instance, the model component 110 can identify azimuth angles associated with the radar data, and determine to further process some but not all of the radar data. In some examples, the model component 110 can determine that the azimuth information meets or exceeds an azimuth threshold (e.g., a predetermined value), and further determine a candidate value based at least in part on the azimuth information meeting or exceeding the azimuth threshold (e.g., an azimuth angle of less than 40 degrees). However, in other examples, the radar data from the radar device may be input into the model without being filtered or reduced by the criteria.

In some examples, the model can determine candidate values representing different amounts to adjust an initial velocity measurement (also referred to as an initial velocity estimate) associated with radar data. For instance, each candidate value can represent a combination of an initial velocity (e.g., a Doppler velocity, a reference velocity, or a combination thereof) and the Doppler interval. The model can select a candidate value for output as the Doppler velocity (e.g., a refined velocity or final velocity) based at least in part on the selected correction value or other criteria (e.g., a minimum number of radar observations, an azimuth range, a maximum azimuth, and the like). Further discussion of determining and selecting values for improving radar determinations are discussed throughout this disclosure including in FIGS. 3-7.

The techniques discussed herein may include capturing or receiving sensor data of an environment, such as radar data from a radar device, or the like. To reduce an amount of data for processing, the techniques can include associating the radar data with a two-dimensional data representation. The two-dimensional data representation (also referred to as a two-dimensional representation or a 2D space) may associate radar data points with one or more of: a Doppler velocity, a Doppler interval, an intensity, a range, an elevation, an azimuth angle, and/or coordinates (e.g., polar and/or Cartesian coordinates), just to name a few.

As mentioned, an output from a model can be used to control a vehicle in the environment. For example, object velocity data output by a model may be sent to a vehicle computing device that can validate the object and use the object velocity data to control an action of the vehicle, such as determining a trajectory for the vehicle or otherwise causing the vehicle to traverse the environment. To avoid a collision with the object, a same or different model of a vehicle computing device can determine a potential intersection point and/or intersection time between the vehicle and the object. In such examples, the vehicle computing device can control operation of the vehicle based at least in part on the object velocity (e.g., the Doppler velocity). For instance, controlling the vehicle may comprise stopping the vehicle and/or controlling at least one of: a braking system, an acceleration system, or a drive system of the vehicle.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used by the model to predict an edge of the object and/or semantic information associated with the object (e.g., an identification, an object type, an object shape, etc.).

In some examples, techniques for determining an object velocity as described herein can be implemented as part of a vehicle safety system running on a resource-constrained platform (e.g., processor and/or memory capacity is limited). In such examples, the model can perform multiple separate operations that are relatively easy to calculate (e.g., determining candidate correction values, selecting one of the candidate correction values for processing, etc.) and limit computations to a finite amount of input data. In this way, the model can output velocity data that acts to improve downstream determinations from a more computationally intensive computing device. This resource savings means that more processing resources can be devoted to additional objects in the environment that may interfere with the vehicle.

In some examples, the vehicle safety system may be implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device. Additional examples of a vehicle architecture comprising a primary computing system and a secondary computing system can be found, for example, in U.S. patent application Ser. No. 16/218,182 titled "Collision Avoidance System with Trajectory Validation" filed Dec. 12, 2018, U.S. patent application Ser. No. 16/218,182 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference for all purposes.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives input data (e.g., perception data) based on the sensor data and AI techniques implemented by the primary system (e.g., vehicle computing device), and may perform various techniques described herein for improving collision prediction and avoidance by the vehicle. By way of example and not limitation, to enable the vehicle to respond quickly and accurately to objects, the model may send velocity information (e.g., Doppler velocities) to a planning component configured to plan a trajectory for the vehicle and/or to a perception component configured to sense the environment. In this way, velocity information from the model can be considered during planning operations (e.g., to avoid the object) and/or during perception operations (e.g., to direct one or more sensors to capture a different level of perception for an object).

A vehicle computing device may allocate an amount of memory, a type of memory, and/or a memory location to make the best use of available memory resources to a model(s) that predict object velocities based on radar data. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to determine an object velocity. A vehicle computing device that implements models may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing the object velocities using a GPU, CPU, or a combination thereof. In this way, each model may be defined to utilize the processing resources that enable the model to perform predictions in the least amount of time (e.g., to use the object velocity in planning considerations of the vehicle). Accordingly, a model may receive input data from another model to make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may act as an attention system (e.g., a vehicle safety system and/or a redundancy to an existing perception component) that provides velocity information for one or more objects in an environment. The velocity information can be used by the vehicle computing device to improve predictions related to the behavior of the vehicle. In some examples, the model improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed (e.g., identifying the vehicle action based on Doppler velocities from the model). The techniques can include the model optimizing available computational resources by performing operations that limit the impact on the available resources (as compared to not implementing the model). Utilizing output data from the model by a vehicle computing device, for instance, can improve the accuracy and/or reduce a latency for the vehicle to respond to a potential collision in the environment. Further, the techniques can include the model optimizing available computational resources by performing operations that limit the impact on the available resources (as compared to not implementing the model).

In various examples, implementing the model can improve safety of a vehicle by outputting improved velocity measurements for consideration during planning operations. For example, a Doppler velocity determined as described herein can be used in a simulation for determining potential actions by each object and/or potential actions by the vehicle in substantially real-time before a safest possible route is determined for the vehicle to follow.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Further, although discussed in the context of lidar data, the techniques can be applicable to any type of sensor data are not limited to specific examples discussed herein. Additionally, the techniques described herein can be used with real data (e.g., captured using sensor(s)), simulated data (e.g., generated by a simulator), or any combination of the two.

FIG. 1 is a pictorial flow diagram of an example process 100 for determining an object velocity based on example radar data. The example process 100 may be implemented by a vehicle computing device, such as the first computing device(s) 504 and/or the second computing device(s) 518 of FIG. 5.

An operation 102 can include receiving radar data of an environment. For example, the operation 102 can include receiving radar data 104 representing an environment (e.g., a real-world environment or a simulated environment). In some examples, the operation 102 can include receiving the radar data 104 from a radar device. In various examples, a vehicle may include multiple radar devices mounted at various locations and various angles relative to the vehicle, to capture the radar data of the environment. For example, the radar device can capture the radar data 104 reflected from a plurality of objects such as a pedestrian, another vehicle, a bicyclist, and so on. The radar data 104 may include any number of objects, each of which may be any type of dynamic or static object, and can include other information describing one or more of: Doppler velocity, Doppler interval, range, azimuth, elevation, intensity, and the like. In some examples, the operation 102 can be performed by an autonomous vehicle as it traverses the environment.

In some examples, the radar data can comprise an initial velocity (e.g., a Doppler velocity that has not been compensated for a Doppler effect) for an object and may therefore represent a detected velocity. The Doppler interval can represent, for example, a fixed velocity that corresponds to a particular scan or observation.

An operation 106 can include determining candidate correction values. For instance, a computing device 108 can implement a model component 110 to determine candidate correction values based at least in part on the radar data. The model component 110 can, for instance, determine correction values based on a Doppler interval included as part of the radar data. In various examples, the model component 110 can receive radar data (e.g., radar data internally processed by the radar device, raw radar data unprocessed by the radar device) from one or more radar devices coupled to or otherwise associated with the vehicle. The radar data may also or instead include a two-dimensional representation of the environment based on different aspects of the radar data (e.g., range, intensity, azimuth angle, coordinates, and the like) with the two-dimensional representation. By way of example and not limitation, the model component 110 can combine different numbers of the Doppler interval (e.g., 1, 2, etc.) with an initial object velocity measurement to generate the candidate correction values. For instance, if the Doppler interval is 30 meters per second (m/s), and an initial velocity is 14 ms, then a first candidate correction value can be 16 m/s and a second candidate correction value can be 44 m/s, and so on. The initial velocity can be associated with an object velocity based on another sensor modality, a vehicle velocity, or another velocity. In some examples, the candidate correction values can represent a variation or combination of the initial velocity and the Doppler interval.

An operation 112 can include selecting a radar correction value. For example, the operation 112 can include the model component 110 identifying a value from the candidate correction values usable as an output and/or for determining a velocity of an object. Generally, the computing device 108 can determine candidate correction values to make more accurate velocity measurements available by selecting the radar correction value based at least in part on one or more criteria or algorithms applied to the radar data.

In various examples, selecting the radar correction value can be based at least in part on applying a rigid body estimation algorithm to two or more radar observations (e.g., radar data associated with different frequencies) to identify an observation having a smallest error among points representing an object. For example, multiple radar observations of an area in an environment can include radar points representing various objects. In some examples, the radar observations can include clusters of radar points corresponding to one or more objects in the environment. That is, the radar data can include a cluster of radar points to represent an object.

In some examples, the model component 110 can perform rigid body estimation on the object clusters associated with different radar observations to identify an error between velocity determinations associated with the different observations. By performing rigid body estimation, the model component 110 can determine velocity measurements for different radar points (such as those associated with a clustered object) and compare the velocities of a same object in different observations one to another, and select the radar correction value as the object velocity associated with the observation having a smallest error among the observations. In some examples, the observations can be associated with a same time but different frequencies emitted from the radar device as part of the scan resulting in the observation.

As used herein, rigid body estimation can assume that individual radar observations (e.g., data points, returns, etc.) correspond to a rigid body wherein each component rigidly changes in position and/or velocity relatively to other observations corresponding to the same rigid body. In other words, the components corresponding to the observations do not substantially flex, deform, or move in position relative to each other and thus represent a rigid body. As disclosed herein, rigid body dynamics can be used to create hypothesis of collections of radar observations and/or velocities for objects to account for Doppler ambiguities.

An operation 114 can include determining an object velocity. For example, the model component 110 can use the radar correction value for determining a velocity for one or more objects in the environment. In various examples, the object velocity can correspond to an adjusted Doppler velocity determined by the model component 110 using the selected correction value. For example, the operation 114 can include determining or detecting a velocity for an object 118 in the environment captured by the radar data. Additional examples of determining an object velocity are discussed throughout this disclosure.

In some examples, the object velocity determined based on the radar correction value can be used by a vehicle computing device to control the vehicle (e.g., determine an action to avoid the objects in the environment). In this way, a vehicle may receive object velocity from a model usable by the vehicle to quickly and/or preemptively avoid objects, thereby improving safety of the vehicle.

In various examples, the model may provide an output representing velocity information based at least in part on different types of information included in the radar data 104 (e.g., Doppler velocity, Doppler interval, intensity data, range data, azimuth angle data, polar coordinates and/or Cartesian coordinates associated with the data points, etc.). To illustrate, a vehicle can detect data points representing potential objects in the environment and implement the model component 110 to process the data points to output a velocity of the object 118. For instance, the computing device 108 (e.g., a vehicle computing device) can receive the velocity information of the object 118 as part of the radar output 116 for further processing (e.g., sensor fusion, determinations or predictions using the radar output).

FIG. 2 is an illustration of example input data 200 for a model implementing the techniques described herein. In some examples, the input data 200 is associated with a model (e.g., the model component 110) implemented by the computing device 108 (e.g., a vehicle safety system that processes radar data of an environment). In various examples, the input data 200 may represent sensor data such as radar data from one or more radar devices coupled to or otherwise associated with an autonomous vehicle.

As depicted in FIG. 2, the input data 200 comprises Doppler data 202, range data 204, azimuth angle data 206, elevation data 208, and intensity data 210. However, other types of input data are contemplated as discussed herein. The Doppler data 202 can represent a Doppler interval(s) and/or a Doppler velocity(ies) received from a radar device. The Doppler interval can represent a predefined value received as part of the radar data.

FIG. 2 depicts some of the input data 200 comprising multiple different two-dimensional representations of an example environment for each input data type. For example, as part of "pre-processing" the sensor data for use as input data, a model of a vehicle safety system may associate sensor data (or portions thereof) with two-dimensional representations to achieve a desired input data size for more efficient processing. The two-dimensional data representation (also referred to as a two-dimensional representation or a 2D space) may associate data points in the environment with one or more types of input data. In various examples, a machine learned model can determine the input data 200 based at least in part on down-sampling and/or up-sampling portions of the sensor data to achieve a desired resolution or data size for the input data 200. For example, lidar data, radar data, or other types of data included as part of the sensor data may be modified for use as input data (e.g., reduced in size and/or resolution) into a model that determines an object velocity based on the input data 200.

In some examples, the input data 200 can be associated with sensor data from one or more sensors (e.g., a lidar sensor, a radar sensor, a camera, etc.). In some examples, the sensor data can be captured from one or more sensors associated with a vehicle and/or one or more autonomous vehicles in a fleet. In some examples, the one or more sensors comprises one or more radar sensors. Generally, dimensions of the 2D space may be discretized into bins corresponding to each type of input data including azimuth angle bins, elevation bins, intensity bins, and so on, which may comprise 5 degrees, 8 degrees, 10 degrees, 18 degrees, 36 degrees, and the like. Additional dimensions of the 2D space may be discretized into beam indices, such as 32, 64, 100, 128, etc. individual beam indices (also referred to as channels).

In some examples, the model component 110 may receive the input data 200 from one or more radar device(s) associated with the vehicle. Different radar device(s) may be mounted or installed at different locations on the vehicle, and may include various types of radar devices providing various elements (or parameters) of radar data to the model component 110.

The input data 200 (e.g., radar data) may include a number of points, each having associated information. Such information may include position information, e.g., a location of the point relative to the sensor, the vehicle, and/or in a coordinate system (any or all of which may be determined based on a range and/or azimuth angle and/or elevation angle of the signal), signal strength information, (e.g., a radar cross-section (RCS) value), or velocity information (e.g., a velocity of the point relative to the sensor).

In some examples, the input data 200 can comprise data point information (e.g., a distance from the vehicle, an azimuth angle relative to the vehicle, intensity, coordinate values, velocity, and so on), vehicle information (e.g., a planned trajectory of the vehicle, position, orientation, steering wheel angle, and so on), environmental information (e.g., weather conditions, elevation, and the like), and/or parameter information (e.g., one or more parameters associated with an algorithm to be implemented by the model).

The range data 204 can represent line of sight distance from the sensor to data points in the environment. The azimuth angle data 206 can represent azimuth angles for data points in the environment relative to a sensor of the vehicle. The elevation data 208 can represent elevation of data points relative to the vehicle or another data point. The elevation data 208 can also or instead represent a difference in elevation between two or more data points relative to the vehicle. In some examples, the intensity data 210 can represent an intensity of a data point relative to another data point in the environment.

Other input data 200 (not shown) comprises one or more of: Cartesian coordinates, polar coordinates, Euclidian coordinates, an average elevation angle relative to the vehicle, a difference in a three dimensional Euclidean distance between the two or more data points, a difference in a radial distance between the two or more data points, a difference in intensity between the two or more data points, a difference in azimuth angle between the two or more data points relative to the vehicle, a difference in elevation between the two or more data points relative to the vehicle, a heading a data point, or a planar angle of data points.

In various examples, the input data 200 may comprise some but not all of the Doppler data 202, the range data 204, the azimuth angle data 206, the elevation data 208, and the intensity data 210. By way of example and not limitation, the input data 200 can comprise the Doppler data 202 and the other input data may optionally be associated with a two-dimensional representation for input into a model. In some examples, the two-dimensional representation comprising the input data can be associated with any one or more examples or types of input data described herein.

In some examples, the input data 200 can represent radar data in a 3D or 4D heatmap, depending on the type of the radar device. In some examples, the dimensions of the 3D or 4D heatmaps may include range data, Doppler data, azimuth data, and/or elevation data, just to name a few.

Figure 3:
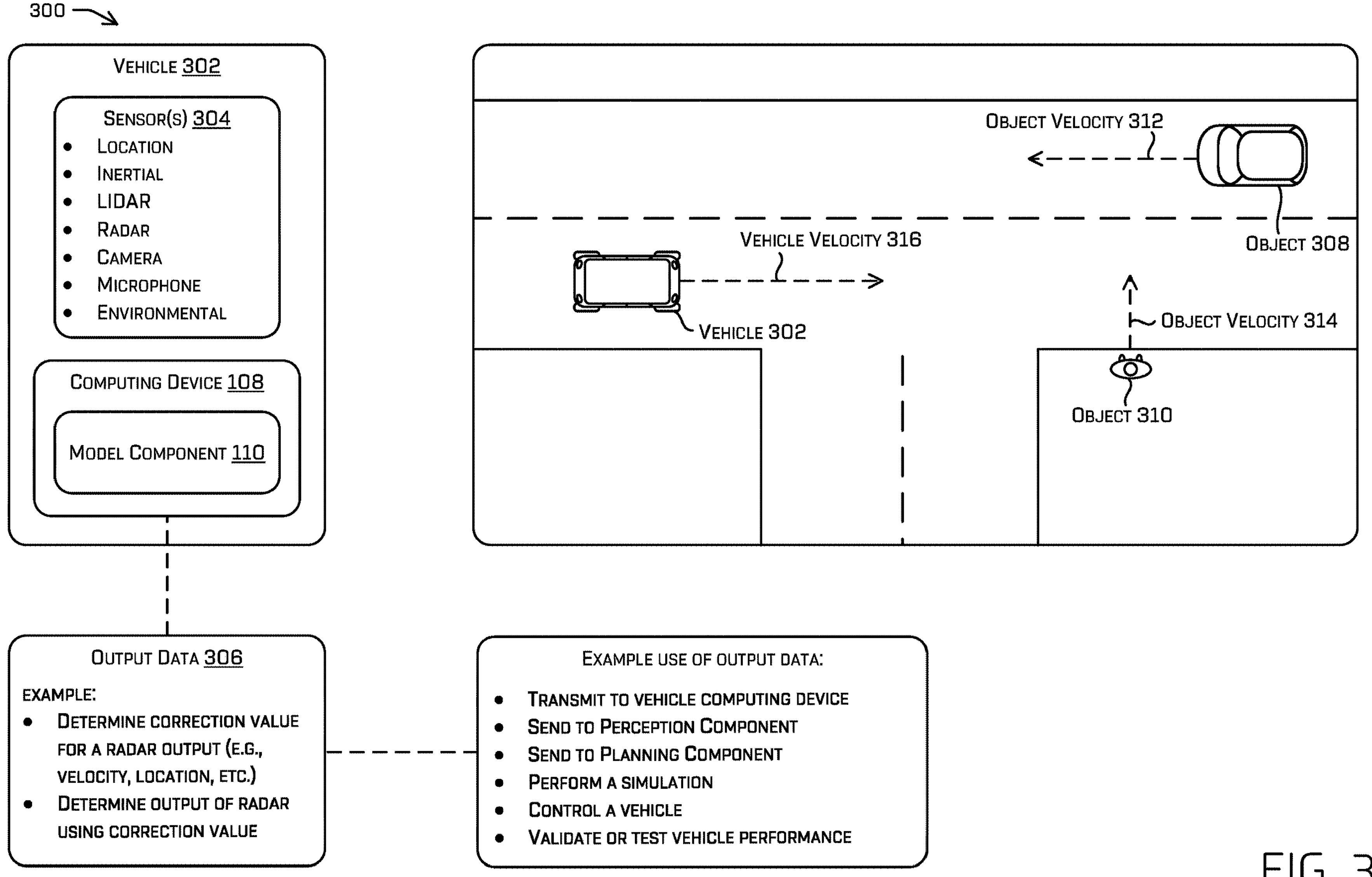
FIG. 3 is an illustration of an example environment, in which an example vehicle implements a model to predict a velocity of an object.

FIG. 3 depicts an example environment 300, in which an example vehicle implements a model to predict a velocity of an object. In some examples, the example environment 300 may be similar to the example provided in FIG. 1. In some examples, a vehicle computing device (e.g., the first computing device(s) 504 and/or the second computing device(s) 518 of FIG. 5) may implement the model(s).

As shown, the example environment 300 includes a vehicle 302 (e.g., an autonomous vehicle) that comprises sensor(s) 304, the computing device 108, and the model component 110 of FIG. 1. As shown in FIG. 3, the environment 300 includes a vehicle 302, though in some examples, the techniques can be performed independent of the vehicle 302 (e.g., by a radar device independent of being coupled to the vehicle). For instance, the computing device 108 can implement the model component 110 to detect, predict, or otherwise determine output data 306 representing an object velocity for each detected object in a region or threshold distance from the vehicle 302.

In some examples, the vehicle 302 may comprise an autonomous or semi-autonomous vehicle with a vehicle computing device configured to receive sensor data from one or more sensors associated with the vehicle. The vehicle 302 may detect objects (and object state data) using the sensor(s) 304 while navigating in the environment 300 (e.g., a real-world environment or a simulated environment).

In various examples, the computing device 108 may be configured to receive sensor data representing object(s) of the environment 300, such as via a perception component (e.g., the perception component 526). In some examples, the vehicle computing device may detect, infer, estimate, or otherwise determine object state data representing characteristics of the object in the environment 300. For example, such object state data may comprise position, velocity, acceleration, size, semantic type, etc. In some examples, the sensor(s) 304 may include sensors mounted on the vehicle 302, and may include, without limitation, location sensors, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 300. In various examples, the vehicle 302 may be configured to transmit and/or receive data from other autonomous vehicles. The data may include sensor data and/or state data, such as sensor data associated with the environment 300.

In some examples, the computing device 108 may be configured to detect an object in the environment 300, such as object 308 (e.g., a vehicle) and object 310 (e.g., a pedestrian), though other objects may also be detected. In some examples, the computing device 108 may be configured to receive, detect, infer, estimate, or otherwise determine one or more trajectories (e.g., orientation, speed, acceleration, etc.) for the vehicle 302 and each detected object, a velocity, a speed, etc. As shown in FIG. 3, the object 308 is associated with object velocity 312 and the object 310 is associated with an object velocity 314 determined by the computing device 108 (e.g., using the perception component 526, the prediction component 528, or another model). The object velocities 312 and 314 (e.g., a lidar velocity, a radial velocity, etc.) can be determined based on lidar data, radar data, and/or other sensor data. The computing device 108 can also determine a vehicle velocity 316 for the vehicle 302 using a planning component or other component configured to provide vehicle state data including the vehicle velocity. In some examples, object state data and/or vehicle state data other than velocity may also be received as input data to the model component 110.

In various examples, the model component 110 can determine the output data 306 based at least in part on applying one or more algorithms to the input data. For example, the model component 110 can determine a correction value for a radar output (e.g., velocity, location, etc.) that modifies or adjusts the object velocity 312 and/or the object velocity 314. The correction value can represent a velocity determined based at least in part on a Doppler interval included in various examples, the correction value can be selected from a set of candidate correction values, as described herein. In some examples, the correction value can be determined based at least in part on the model component 110 analyzing radar data points associated with the input data. For instance, the model component 110 can apply a rigid body estimation algorithm to radar points in each observation of a set of observations (e.g., two or more observations) to identify an observation having a smallest error among velocity determinations of various radar points, belong to a same clustered object and/or an observation having a smallest error among velocity measurements of different observations. In some examples, a velocity determination associated with an observation having a smallest error compared to an error of another observation can be selected by the model component 110 as the output data 306. By analyzing the observations using rigid body estimation, the computing device 108 can consider multiple potential velocities for output that are based on different Doppler intervals.

The output data 306 can be used by the vehicle 302 in a variety of ways. For example, the output data 306 can be sent to a perception component, a prediction component, a planning component, or other component of a vehicle computing device. By way of example and not limitation, the output data 306 can be used in a simulation between the vehicle 302, the object 308, and the object 310. A result of the simulation can be used to control the vehicle 302 such as to determine a vehicle trajectory. The output data 306 may also or instead be used to validate or test vehicle performance of a vehicle controller associated with the vehicle 302.

Figure 4:
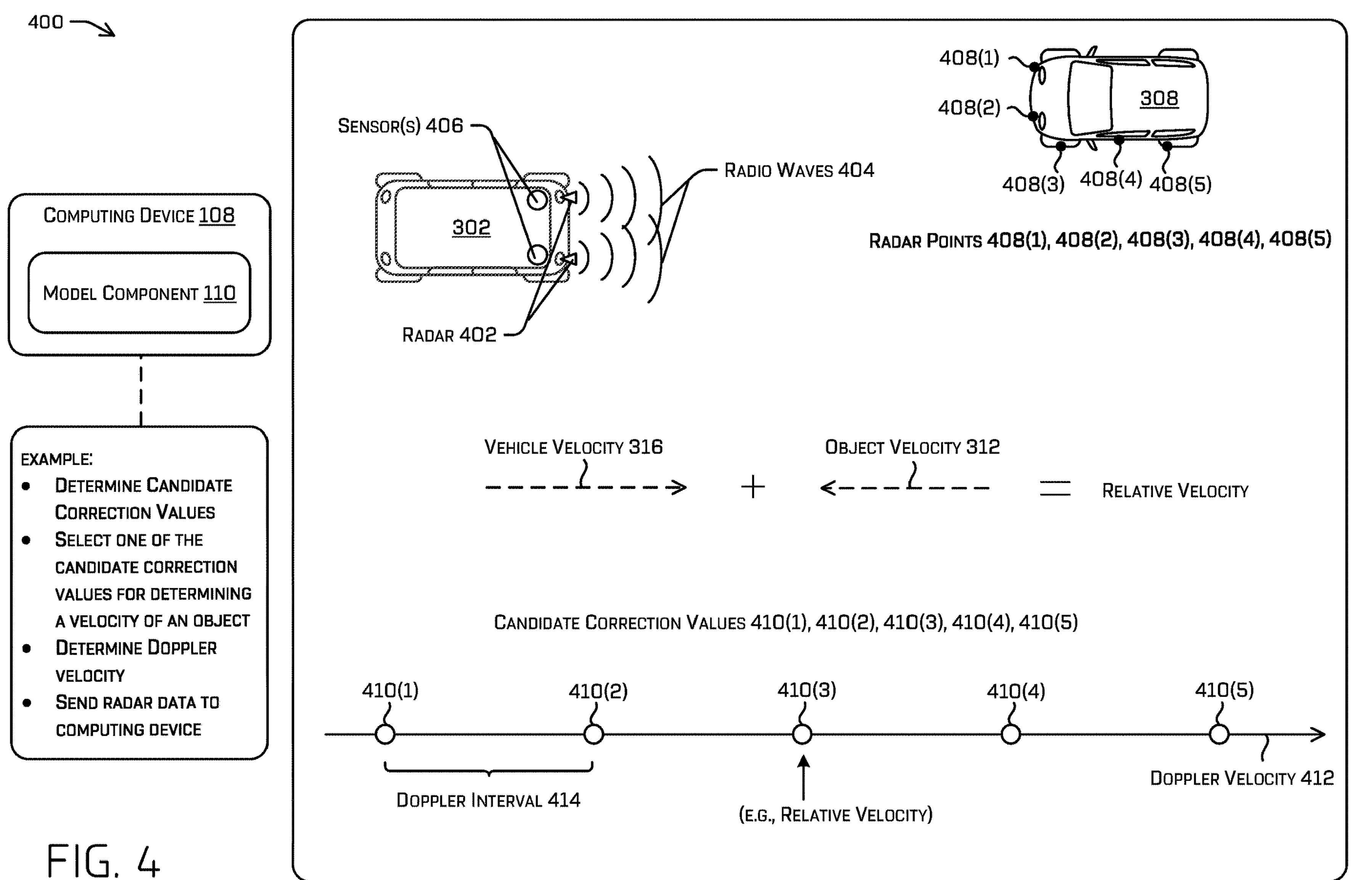
FIG. 4 is an illustration of an example implementation for determining an object velocity based on radar data as described herein.

FIG. 4 is an illustration of an example implementation 400 for determining an object velocity based on radar data as described herein. The example implementation 400 may be performed by the computing device 108 of FIG. 1 or a vehicle computing device (e.g., the first computing device(s) 504 and/or the second computing device(s) 518 of FIG. 5).

As shown, the vehicle 302 includes radar 402 representing a radar device configured to capture radar data of the example environment 300. The radar 402 may transmit radio waves 404 which reflect off surfaces within the example environment 300 and return to the radar 402. In some examples, the radar 402 may be used to determine a distance from the radar device to objects within the environment 300 usable for determining a velocity of the object. In various examples, a location of the radar 402 on the vehicle 302 can vary, as can a number of radar devices coupled to the vehicle 302.

In some examples, the radar 402 may transmit and receive the radio waves 404 or otherwise propagate waves in an environment of the vehicle 302. In some examples, the radio waves 404 emitted by the radar 402 will reflect off the object 308 return to the radar 402, where they are detected via a radar scan. In some examples, the radar 402 may be substantially identical, except for their position on the vehicle 302. In other examples, however, the radar 402 may be differently configured. By way of non-limiting example, the radio waves 404 may be emitted at different frequencies, e.g. pulse-regulated frequencies. Also in examples, the radar 402 may be configured such that scans at a particular sensor includes a different interval (e.g., a Doppler interval). In examples, features of the radar 402, including but not limited to the center frequency, the scan type, the scan pattern, frequency modulation, the pulse repetition frequency, pulse repetition interval, may be configured, e.g., to create the different Doppler intervals. In other examples, however, several features and functions of the radar 402 may be the same or similar.

The radar 402 may receive the radio waves 404 after the waves reflect off a surface in the environment, e.g., a surface of the object 308, and the radar 402 can generate radar data based on the reflection. For instance, the radar data may include diverse types of information, including but not limited to a velocity associated with each of many points representative of surfaces or objects in the environment of the sensor(s) 406. By way of non-limiting example, when the radar 402 are pulse-Doppler sensors, the radar 402 may be able to determine a Doppler velocity (e.g., a velocity of an object relative to the respective sensor).

As illustrated in FIG. 4, the vehicle 302 also includes a plurality of sensor(s) 406. The sensor(s) 406 may be disposed to sense objects generally in the same direction as the radar 402. Without limitation, the sensor(s) 406 may be one or more of additional radar sensors, lidar sensors, imaging sensors (e.g., cameras), time-of-flight sensors, sonar sensors, thermal imaging devices, or any other sensor modalities.

Although two instances of the sensor(s) 406 are illustrated in FIG. 4, the vehicle 302 may include any number of additional sensors, with any number of different modalities. In examples, the radar 402 and the sensor(s) 406 may be disposed generally to detect objects proximate the vehicle 302 may include a number of additional sensors disposed to detect objects at other relative positions. Without limitation, the vehicle 302 can include instances of the radar 402 and/or instances of the sensor(s) 406 that provide for sensing objects at 360-degrees relative to the vehicle 302.

FIG. 4 illustrates a plurality of radar returns, schematically represented by points. In the illustration, radar points 408(1), 408(2), 408(3), 408(4), 408(5) are illustrated as circles, and represent radar returns associated with the object 308. That is, individual of the radar points 408(1)-408(5) (collectively referred to as the radar points 408) are indicative of locations on the object 308 at which the radio waves 404 reflect.

As noted above, the radar points 408 may have an associated velocity such as a Doppler velocity. The radar points 408 may also have a range, e.g., a depth or distance from the sensor, and an azimuth, e.g., an angle relative to some reference line. In other examples, the radar 402 may be four-dimensional radar sensor(s), capable of also determining an elevation, e.g., an angle or distance above a horizontal reference plane (e.g., a ground plane, which may be parallel to the two-dimensional plane of FIG. 1). Thus, the radar 402 may be capable of generating, per point, depth information, azimuth information, elevation information, and/or velocity information. For example, aspects of the radar data may be used to modify an initial radial velocity of the object 308, as described herein.

In some examples, the radar data may include signal strength information. For example, the signal strength information can indicate a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may include a radar cross-section (RCS) measurement. As also noted above, the radar data also includes velocity information. For instance, a velocity of each of the radar points 408 may be based on a frequency of radio energy reflected from surfaces at the radar points 408 and/or a time at which the reflected radio energy is detected.

Accordingly, the radar data can include per-point (e.g., of the radar points 408) or per-return, a distance from the radar 402 (e.g., a range or radial distance), one or more locations relative to the radar 402 (e.g., an azimuth angle and/or elevation angle), a velocity (e.g., a Doppler velocity) along the distance, a strength measurement (e.g., an RCS value), and/or additional information.

The sensor(s) 406 can generate sensor data usable to determine an object velocity such as a velocity determined by a lidar sensor. In various examples, the radar data and/or the sensor data can determining a velocity, speed, or other input for determining candidate correction values. For instance, the model component 110 can determine a Doppler interval based at least in part on the radar data (e.g., parse the radar data to identify the Doppler interval(s) for different scans), and configure candidate correction values based on the Doppler interval. For instance, FIG. 4 shows candidate correction values 410(1), 410(2), 410(3), 410(4), 410(5) (referred to collectively as the candidate correction values 410 associated with a Doppler velocity 412. The model component 110 can select one of the candidate correction values 410 for output as the Doppler velocity 412.

The candidate correction values 410 can be separated by a length equal to a Doppler interval 414. In various examples, the model component 110 can determine a relative velocity by comparing the vehicle velocity 316 and the object velocity 312 (e.g. a difference) and determining the candidate correction value 410 (3) to represent the relative velocity. The model component 110 can determine any number of candidate correction values though fewer than ten candidate correction values are sufficient in most examples.

The model component 110 can determine one of the candidate correction values as a final correction value based at least in part on analyzing the radar points associated with radio waves 404 received at a point in time, or over a time period. For instance, radar points for one or more correction values can be analyzed using an algorithm to determine a standard deviation algorithm, a square root algorithm, or other algorithm that identifies a relationship among the radar points. In some examples, the candidate correction values 410 can account for a Doppler effect associated with the radio waves 404 that reach the radar 402. Typical radar can report a velocity without taking into consideration the varying candidate correction values. Using the techniques described herein, more accurate object velocities can be determined in less time to improve subsequent determinations using the object velocities as input.

In various examples, the final correction value can be transmitted to a vehicle computing device for use in operating a vehicle and/or to a computing device configured to analyze determinations from the model component 110 to improve future predictions.

Figure 5:
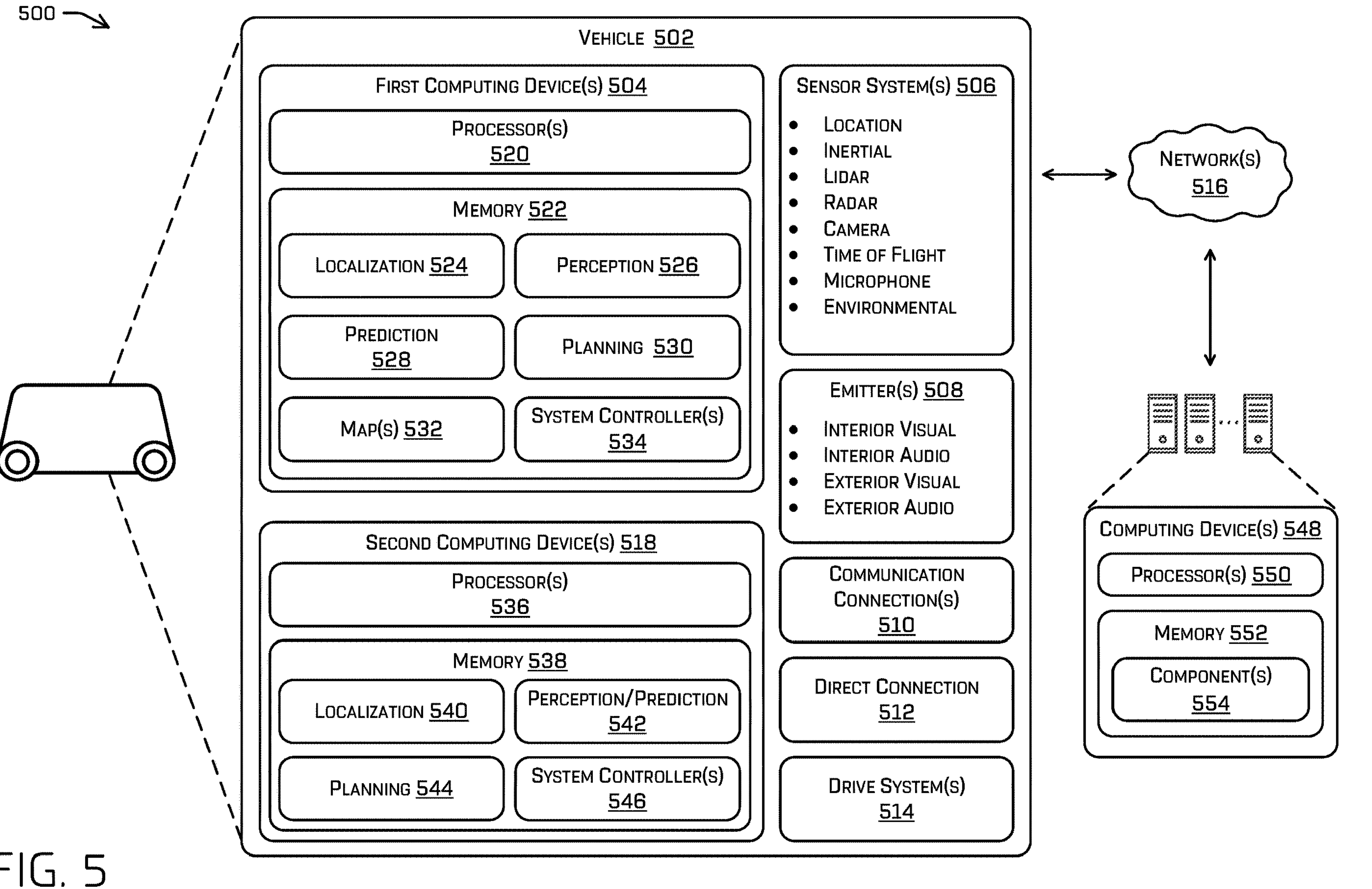
FIG. 5 is a block diagram of an example system for implementing the techniques described herein.

FIG. 5 is a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more first computing devices 504, one or more sensor systems 506, one or more emitters 508, one or more communication connections 510 (also referred to as communication devices and/or modems), at least one direct connection 512 (e.g., for physically coupling with the vehicle 502 to exchange data and/or to provide power), and one or more drive systems 514. The one or more sensor systems 506 can be configured to capture sensor data associated with an environment.

The sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the first computing device(s) 504.

The vehicle 502 can also include emitter(s) 508 for emitting light and/or sound. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include communication connection(s) 510 that enable communication between the vehicle 502 and one or more other local or remote computing device(s) (e.g., a remote teleoperation computing device) or remote services. For instance, the communication connection(s) 510 can facilitate communication with other local computing device(s) on the vehicle 502 and/or the drive system(s) 514. Also, the communication connection(s) 510 can allow the vehicle 502 to communicate with other nearby computing device(s) (e.g., other nearby vehicles, traffic signals, etc.).

The communications connection(s) 510 can include physical and/or logical interfaces for connecting the first computing device(s) 504 to another computing device or one or more external networks 516 (e.g., the Internet). For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include the sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The vehicle 502 can include one or more second computing devices 518 to provide redundancy, error checking, and/or validation of determinations and/or commands determined by the first computing device(s) 504.

By way of example, the first computing device(s) 504 may be considered to be a primary system, while the second computing device(s) 518 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a velocity for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference for all purposes.

The first computing device(s) 504 can include one or more processors 520 and memory 522 communicatively coupled with the one or more processors 520. In the illustrated example, the memory 522 of the first computing device(s) 504 stores a localization component 524, a perception component 526, a prediction component 528, a planning component 530, a maps component 532, and one or more system controllers 534. Though depicted as residing in the memory 522 for illustrative purposes, it is contemplated that the localization component 524, the perception component 526, the prediction component 528, the planning component 530, the maps component 532, and the one or more system controllers 534 can additionally, or alternatively, be accessible to the first computing device(s) 504 (e.g., stored in a different component of vehicle 502 and/or be accessible to the vehicle 502 (e.g., stored remotely).

In memory 522 of the first computing device 504, the localization component 524 can include functionality to receive data from the sensor system(s) 506 to determine a position of the vehicle 502. For example, the localization component 524 can include and/or request/receive a three-dimensional map of an environment (and/or a map based on semantic objects) and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory, as discussed herein.

The perception component 526 can include functionality to perform object detection, segmentation, and/or classification. In some examples, the perception component 526 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional or alternative examples, the perception component 526 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 526 can use perception algorithms to determine a perception-based bounding box associated with an object in the environment based on sensor data. For example, the perception component 526 can receive image data and classify the image data to determine that an object is represented in the image data. Then, using detection algorithms, the perception component 526 can generate a two-dimensional bounding box and/or a perception-based three-dimensional bounding box associated with the object. The perception component 526 can further generate a three-dimensional bounding box associated with the object. As discussed above, the three-dimensional bounding box can provide additional information such as a location, orientation, pose, and/or size (e.g., length, width, height, etc.) associated with the object.

The perception component 526 can include functionality to store perception data generated by the perception component 526. In some instances, the perception component 526 can determine a track corresponding to an object that has been classified as an object type. For purposes of illustration only, the perception component 526, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

In some examples, the perception component 526 can include the functionality of the model component 110 including determining an object velocity for one or more objects detected by the vehicle 502 using the first computing device(s) 504 and/or the second computing device(s) 518.

The stored perception data can, in some examples, include fused perception data captured by the vehicle 502. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 528 can generate one or more probability maps representing prediction probabilities of possible locations of one or more objects in an environment. For example, the prediction component 528 can generate one or more probability maps for vehicles, pedestrians, animals, and the like within a threshold distance from the vehicle 502. In some instances, the prediction component 528 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 530 can determine a path for the vehicle 502 to follow to traverse through an environment. For example, the planning component 530 can determine various routes and paths and various levels of detail. In some instances, the planning component 530 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 530 can generate an instruction for guiding the autonomous vehicle along at least a portion of the route from the first location to the second location. In at least one example, the planning component 530 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 530 can alternatively, or additionally, use data from the perception component 526 and/or the prediction component 528 to determine a path for the vehicle 502 to follow to traverse through an environment. For example, the planning component 530 can receive data from the perception component 526 and/or the prediction component 528 regarding objects associated with an environment. Using this data, the planning component 530 can determine a route to travel from a first location (e.g., a current location) to a second location (e.g., a target location) to avoid objects in an environment. In at least some examples, such a planning component 530 may determine there is no such collision free path and, in turn, provide a path which brings vehicle 502 to a safe stop avoiding all collisions and/or otherwise mitigating damage.

The memory 522 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the map(s) 532. That is, the map(s) 532 can be used in connection with the localization component 524, the perception component 526, the prediction component 528, and/or the planning component 530 to determine a location of the vehicle 502, identify objects in an environment, generate prediction probabilit(ies) associated with objects and/or the vehicle 502, and/or generate routes and/or trajectories to navigate within an environment.

In some examples, the one or more maps 532 can be stored on a remote computing device(s) (such as the computing device(s) 548) accessible via network(s) 516. In some examples, multiple maps 532 can be stored based on, for example, a characteristic (e.g., type of entity, time of day, day of week, season of the year, etc.). Storing multiple maps 532 can have similar memory requirements but can increase the speed at which data in a map can be accessed.

In at least one example, the first computing device(s) 504 can include one or more system controller(s) 534, which can be configured to control steering, propulsion, braking, safety, emitters, communication, and other systems of the vehicle 502. These system controller(s) 534 can communicate with and/or control corresponding systems of the drive system(s) 514 and/or other components of the vehicle 502, which may be configured to operate in accordance with a path provided from the planning component 530.

The second computing device(s) 518 can comprise one or more processors 536 and memory 538 including components to verify and/or control aspects of the vehicle 502, as discussed herein. In at least one instance, the one or more processors 536 can be similar to the processor(s) 520 and the memory 538 can be similar to the memory 522. However, in some examples, the processor(s) 536 and the memory 538 may comprise different hardware than the processor(s) 520 and the memory 522 for additional redundancy.

In some examples, the memory 538 can comprise a localization component 540, a perception/prediction component 542, a planning component 544, and one or more system controllers 546.

In some examples, the localization component 540 may receive sensor data from the sensor(s) 506 to determine one or more of a position and/or orientation (together a pose) of the autonomous vehicle 502. Here, the position and/or orientation may be relative to point(s) and/or object(s) in an environment in which the autonomous vehicle 502 is located. In examples, the orientation may include an indication of a yaw, roll, and/or pitch of the autonomous vehicle 502 relative to a reference plane and/or relative to point(s) and/or object(s). In examples, the localization component 540 may perform less processing than the localization component 524 of the first computing device(s) 504 (e.g., higher-level localization). For instance, the localization component 540 may not determine a pose of the autonomous vehicle 502 relative to a map, but merely determine a pose of the autonomous vehicle 502 relative to objects and/or surfaces that are detected around the autonomous vehicle 502 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 542 can include functionality to detect, identify, classify, and/or track object(s) represented in sensor data. For example, the perception/prediction component 542 can perform object velocity determination techniques, as discussed herein.

In some examples, the perception/prediction component 542 may comprise an M-estimator, but may lack an object classifier such as, for example, a neural network, decision tree, and/or the like for classifying objects. In additional or alternate examples, the perception/prediction component 542 may comprise an ML model of any type, configured to disambiguate classifications of objects. By contrast, the perception component 526 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 542 (and/or the perception component 526) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 542 may also process the input data to determine one or more predicted trajectories for an object. For example, based on a current position of an object and a velocity of the object over a period of a few seconds, the perception/prediction component 542 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 544 can include functionality to receive a trajectory from the planning component 530 to validate that the trajectory is free of collisions and/or is within safety margins. In some examples, the planning component 544 can generate a safe stop trajectory (e.g., a trajectory to stop the vehicle 502 with a "comfortable" deacceleration (e.g., less than maximum deceleration)) and in some examples the planning component 544 can generate an emergency stop trajectory (e.g., maximum deceleration with or without steering inputs).

In some examples, the system controller(s) 546 can include functionality to control safety critical components (e.g., steering, braking, motors, etc.) of the vehicle. In this manner, the second computing device(s) 518 can provide redundancy and/or an additional hardware and software layer for vehicle safety.

The vehicle 502 can connect to computing device(s) 548 via the network 516 and can include one or more processors 550 and memory 552 communicatively coupled with the one or more processors 550. In at least one instance, the one or more processors 550 can be similar to the processor(s) 520 and the memory 552 can be similar to the memory 522. In the illustrated example, the memory 552 of the computing device(s) 548 stores a component(s) 554, which may correspond to any of the components discussed herein.

The processor(s) 520, 536, and/or 550 can be any suitable processor capable of executing instructions to process data and perform operations as described herein. By way of example and not limitation, the processor(s) 520, 536, and/or 550 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 522, 538, and/or 552 are examples of non-transitory computer-readable media. The memory 522, 538, and/or 552 can store an operating system and one or more software applications, instructions, programs, and/or data to implement the methods described herein and the functions attributed to the various systems. In various implementations, the memory 522, 538, and/or 552 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 522, 538, and/or 552 can be implemented as a neural network. In some examples, the components in the memory 522, 538, and/or 552 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (1D3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 6:
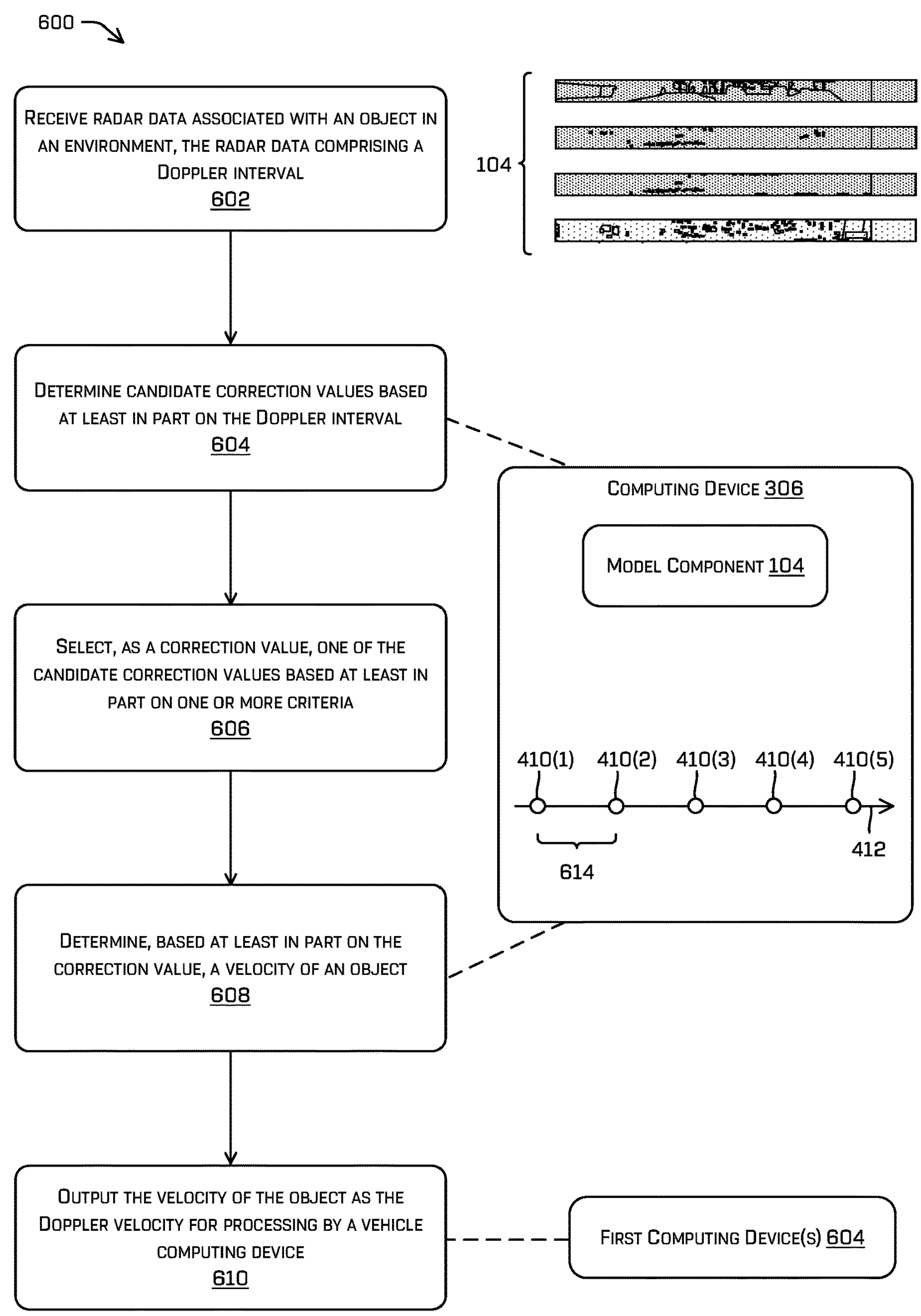
FIG. 6 is a flowchart depicting an example process for determining an object velocity using an example model.

FIG. 6 is a flowchart depicting an example process 600 for determining an object velocity using an example model. For example, some or all of the process 600 can be performed by the computing device 108 of FIG. 1 or one or more components in FIG. 5, as described herein. For example, some or all of the process 600 can be performed by the first computing device(s) 504 and/or the second computing device(s) 518.

At operation 602, the process may include receiving radar data associated with an object in an environment, the radar data comprising a Doppler interval. In some examples, the operation 602 may include a vehicle computing device capturing radar data from a radar sensor of the vehicle 502. In some examples, the radar data comprises data points of the environment, such as radar points 408. The radar data may be received from one or more sensors on the vehicle and/or from one or more remote sensors, and may also be associated with multiple radar scans. In some examples, the operation 602 may include the model component 110 receiving the input data comprising one or more two-dimensional data representations.

At operation 604, the process may include determining candidate correction values based at least in part on the Doppler interval. In some examples, the operation 604 may include a vehicle computing device inferring, estimating, or otherwise determining two-dimensional data representations of the environment based at least in part on the radar data. In various examples, portions of the radar data (e.g., the Doppler data 202, the coordinate data, the range data 204, the azimuth angle data 206, and the like) can be associated with different two-dimension representations for use as input data (e.g., the input data 200). In various examples, the radar data can comprise one or more of: Doppler interval(s), Doppler velocity data (e.g., an initial Doppler velocity), intensity data for a data point, range data for the data point, azimuth angle data relative to the vehicle, elevation data for the data point, a heading of a data point, a planar angle of data points, coordinates for the two or more points in the environment, etc.

At operation 606, the process may include selecting, as a correction value, one of the candidate correction values based at least in part on one or more criteria. In some examples, the operation 606 may include the model component 110 selecting a candidate correction value based on applying an algorithm to the radar data to identify one of the candidate correction values for further processing.

At operation 608, the process may include determining, based at least in part on the correction value, a velocity of the object. For instance, the model component 110 can output the Doppler velocity of an object based on the correction value. In some examples, the correction value can correspond to the Doppler velocity while in other examples the correction value can be applied to an initial velocity to modify the initial velocity. In some examples, the model component 110 can also receive a reference velocity as input, and the correction value can be applied to the reference velocity. For example, the reference velocity can represent a lidar velocity (e.g., a velocity determined from lidar data), a vehicle velocity, and so on, and may be used to determine a relative velocity of the object relative to the vehicle.

In some examples, the reference velocity can be based on object track information received from the perception/prediction component 542 (and/or the perception component 526). For instance, object tracks (e.g., historical, current, and/or predicted object position, velocity, acceleration, and/or heading) for one or more objects can be received as input data by the model component 110. In various examples, the model component 110 may also or instead use the object track information to determine a candidate correction value or point and/or to select a candidate correction value (e.g. using yaw information). Additional examples of using a radar device to track an object over time can be found, for example, in U.S. patent application Ser. No. 16/795,411 titled "Radar-Tracked Object Velocity and/or Yaw" and filed Feb. 19, 2020, the entirety of which is herein incorporated by reference for all purposes.

At operation 610, the process may include outputting the velocity of the object as the Doppler velocity for processing by a vehicle computing device. For instance, the model component 110 can send Doppler velocity to the first computing device(s) 504. In some examples, the first computing device(s) 504 can control the vehicle 502 based on a Doppler velocity received from the model component 110. For instance, the Doppler velocity may be used by a perception component (e.g., perception component 526) and/or a planning component (e.g., planning component 530 and/or 544). In some examples, controlling the vehicle can include determining a trajectory of the vehicle 502 based on the Doppler velocity. The vehicle 502 may be controlled to move according to (e.g., follow) the vehicle trajectory.

In various examples, process 600 may return to 602 after performing operation 610. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

Figure 7:
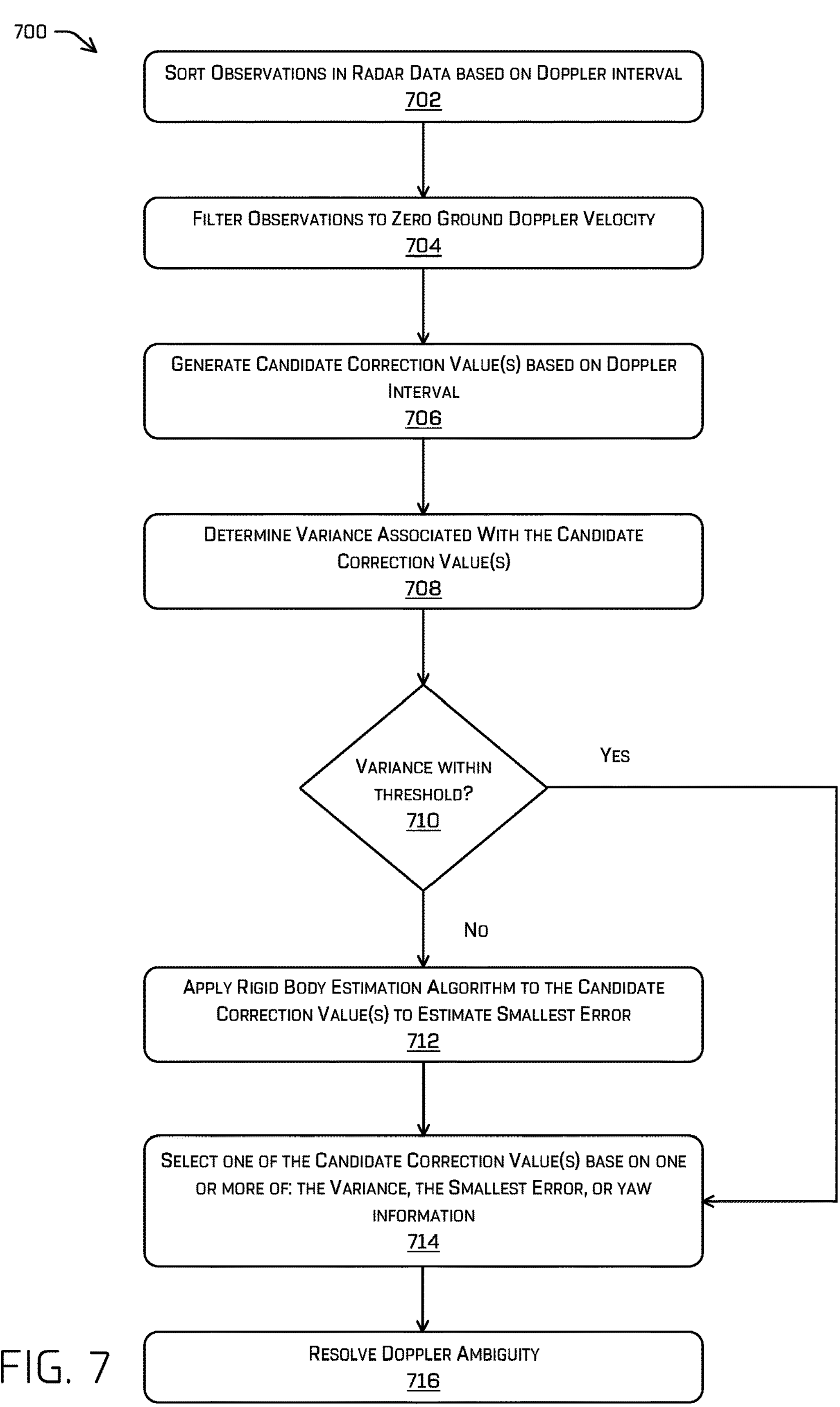
FIG. 7 is a flowchart depicting an example process for resolving Doppler ambiguity associated with an example radar device.

FIG. 7 is a flowchart depicting an example process 700 for resolving Doppler ambiguity associated with an example radar device. For example, some or all of the process 700 can be performed by the computing device 108 of FIG. 1 or one or more components in FIG. 5, as described herein. For example, some or all of the process 700 can be performed by the first computing device(s) 504 and/or the second computing device(s) 518.

At operation 702, the process may include sorting observations in radar data based on a Doppler interval. In some examples, the operation 702 may include a vehicle computing device receiving radar data from a radar sensor of the vehicle 502. The radar data can represent different observations (scans at varying frequencies) performed at a particular time and/or over a time period. The vehicle computing device can implement the model component 110 to identify the Doppler interval(s) associated with each of the different observations. The model component 110 can sort, group, or otherwise combine the observations according to a Doppler interval (e.g., observations having a same Doppler interval can be determined). In various examples, the observations can represent an object in the environment.

At operation 704, the process may include filtering observations outside of a threshold variance from a mean velocity of the group of observations selected at step 702. For example, the threshold can be a multiple of standard deviations from a mean of a group of observations. As disclosed herein, the group can be adjusted based on Doppler interval to create various hypothesis groups. Each of these groups may assume that the velocity offset reported from radar is in relation to a corresponding different base velocity (being a multiple of the Doppler interval). The filtering may be done at any time before or after the creation of these hypothesis groups. Additionally, these groups may be created for any combination of observations (e.g., such as when observations have multiple Doppler intervals within a group).

At operation 706, the process may include generating candidate velocity correction value(s) based on the Doppler interval. In some examples, the operation 706 may include the model component 110 determining values that are mathematically derived from the Doppler interval. The derived values may be different velocities determined based on applying an offset reported for an observation and a corresponding hypothetical velocity that can be an integer multiple of the Doppler interval for that observation. As disclosed herein, the hypothetical velocities can be applied to any subset of points in any combination that are currently grouped for analysis to form multiple hypothesis groups. These span of Doppler interval corrections may correspond to the filtering at operation 704. For example, a span of 5 (2 above and 2 below a baseline) Doppler intervals may correspond to filtering out all points exceeding 3 standard deviations from a mean velocity for the group.

At operation 708, the process may include determining variance associated with the candidate hypothesis groups. In some examples, the operation 708 may include the model component 110 determine a variance between velocities of observations within each hypothesis group. The variance can be applied to velocities for corresponding observations. Due to a velocity of the object, a size of an object, a direction of travel, or other characteristics, radar points for a same object can vary is distance from the radar device. Thus, some observations may reflect different velocities due to the Doppler effect and may exceed a doppler velocity of a scan used to determine an observation leading to Doppler ambiguity.

At operation 710, the process may include determining that the variance associated with the candidate correction value(s) is within a threshold. In some examples, the operation 708 may include the model component 110 comparing the variance to a variance threshold (e.g., a predetermined value (95%) determined by a computing device and/or user). In examples when the variance meets or exceeds the variance threshold (e.g., the variance is within a sufficient value or range for consideration in selecting one of the candidate correction values), the process can proceed to operation 714. In some examples, the variance threshold may be dynamic based on the size of a group, the Doppler interval, velocities of observations, a type of radar device, etc. In examples when the variance is more than the variance threshold for more than one hypothesis group, the process can proceed to operation 712. In some examples, when only one hypothesis group meets the variance threshold, that hypothesis group can be output by component 110 and the process can end.

At operation 712, the process may include applying a rigid body estimation algorithm to the candidate correction value(s) to estimate smallest error among radar points of an object. As disclosed herein, rigid body dynamic can be used to determine position and/or yaw rate information of a an object corresponding to radar observations. In some examples, the operation 712 may include the model component 110 implementing rigid body estimations for each of the hypothesis groups that meet the variance threshold of potation 710 and further determining which observations result in a minimal least squares error and/or estimated yaw rate using techniques disclosed in U.S. patent application Ser. No. 16/795,411 . . . . For example, the model component 110 can identify an error associated with a rigid body estimation of an object, and use the error to select a candidate correction value as described herein.

At operation 714, the process may include selecting one of the hypothesis groups based on one or more of: the variance, the least squares error, or yaw information. In some examples, the operation 714 may include the model component 110 identifying the hypothesis group with the smallest variance as the selected value. In examples when the variances of two hypothesis groups are within a threshold similarity (sufficiently similar), yaw information associated with the object can be used to select one of the values. For example, yaw information can be included as part of the sensor data the model component 110 receives as input. An object can include an articulated vehicle such as a bus or tractor trailer, and the yaw of the object may be used to select between two candidate correction values (e.g., if the yaw is over a yaw threshold the candidate correction value may not be realistic such as when the articulated vehicle is turning).

At operation 716, the process may include resolving Doppler ambiguity associated with the radar data. In some examples, the operation 716 may include the model component 110 determining the output data 308 representing a velocity determination for an object in the environment that accounts for the Doppler effect by selecting a candidate correction value as an output velocity from the radar device. In various examples, the velocity output by the model component 110 can be used by the autonomous vehicle the navigate in the environment.

FIGS. 1, 6, and 7 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For instance, the operations 708 and 710 may be omitted in some operations in which case operation 706 can proceed to operation 712.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing computer-executable instructions that, when executed, cause the system to perform operations comprising: receiving radar data associated with an object in an environment; identifying a Doppler interval associated with the radar data; determining, based at least in part on the Doppler interval, candidate values for correcting an initial velocity estimate associated with the radar data; selecting, as a correction value and based at least in part on rigid body estimation of radar points associated with the radar data, one of the candidate values; determining, based at least in part on the correction value, a refined velocity of the object; and sending the refined velocity of the object to a vehicle computing device configured to control a vehicle in the environment.

B: The system of paragraph A, wherein: the candidate values correspond to hypothesis groups wherein each of the hypothesis groups corresponds to a different correction value derived by applying an integer multiple to the Doppler interval and applying velocity offsets associated with the radar data.

C: The system of paragraph A or B, the operations further comprising: receiving a reference velocity representing one of: a vehicle velocity associated with the vehicle, an object velocity associated with the object, or a lidar velocity determined by a lidar sensor associated with the vehicle; and determining the candidate values based at least in part on the reference velocity.

D: The system of any of paragraphs A-C, wherein the radar data comprises azimuth information, and the operations further comprise: determining that the azimuth information associated with the radar data falls within an azimuth threshold, wherein determining the candidate values is further based at least in part on the azimuth information falling within the azimuth threshold.

E: The system of any of paragraphs A-D, wherein: the radar data comprises a Doppler velocity associated with the object, the correction value represents a correction velocity, and the operations further comprise: combining the Doppler velocity and the correction velocity; and determining the refined velocity of the object based at least in part on the combining.

F: The system of any of paragraphs A-E, wherein: the radar data comprises yaw information associated with the object, wherein the yaw information is determined based at least in part on the rigid body estimation; and selecting the correction value is based at least in part on comparing the yaw information.

G: One or more non-transitory computer-readable media storing instructions executable by a processor, wherein the instructions, when executed, cause the processor to perform operations comprising: receiving radar data associated with an object in an environment, the radar data comprising Doppler interval information and a set of radar observations associated with different frequencies; determining, based at least in part on the Doppler interval information, candidate values for correcting an initial velocity estimate associated with the radar data; selecting, as a correction value and based at least in part on rigid body estimation of the set of radar observations, one of the candidate values; determining, based at least in part on the correction value, a refined velocity of the object; and outputting the refined velocity of the object for processing by a vehicle computing device.

H: The one or more non-transitory computer-readable media of paragraph G, wherein: the refined velocity comprises a Doppler velocity, the radar data comprises a set of radar observations, and selecting one of the candidate values as the correction value based at least in part on applying the rigid body estimation to each radar observation in the set of radar observations.

I: The one or more non-transitory computer-readable media of paragraph G or H, wherein the radar data is received from a radar device, and the operations further comprising: receiving sensor data from a sensor different from the radar device; wherein determining the candidate values is further based at least in part on the sensor data.

J: The one or more non-transitory computer-readable media of any of paragraphs G-I, wherein the radar data comprises azimuth information, and the operations further comprise: determining that the azimuth information meets or falls within an azimuth threshold; and determining the candidate values is further based at least in part on the azimuth information meeting or falling within the azimuth threshold.

K: The one or more non-transitory computer-readable media of any of paragraphs G-J, wherein: the radar data comprises a Doppler velocity associated with the object, the correction value represents a correction velocity, and the operations further comprise: modifying the Doppler velocity based at least in part on the correction velocity; and determining the refined velocity of the object based at least in part on the modifying the Doppler velocity.

L: The one or more non-transitory computer-readable media of paragraph G, wherein: determining yaw information associated with the object is based at least in part on the rigid body estimation, and selecting the correction value is based at least in part on comparing the yaw information.

M: The one or more non-transitory computer-readable media of any of paragraphs G-L, wherein the candidate values correspond to hypothesis groups wherein each of the hypothesis groups corresponds to a different correction value derived by applying an integer multiple to the Doppler interval and applying velocity offsets associated with the radar data.

N: The one or more non-transitory computer-readable media of paragraph M, wherein the candidate values are further determined based on determining that a variance of velocities within one of the hypothesis groups meets a threshold variance.

O: The one or more non-transitory computer-readable media of any of paragraphs G-N, wherein the selecting is based at least in part on a rigid body estimation algorithm to each observation in the set of observations.

P: The one or more non-transitory computer-readable media of any of paragraphs G-O, the operations further comprising: sending the velocity to a prediction component associated with a vehicle; and causing the prediction component to determine an object trajectory associated with the object based at least in part on the velocity, and controlling the vehicle in the environment relative to the object based at least in part on the object trajectory.

Q: A method comprising: receiving radar data associated with an object in an environment, the radar data comprising Doppler interval information and a set of radar observations associated with different frequencies; determining, based at least in part on the Doppler interval information, candidate values for correcting an initial velocity estimate associated with the radar data; selecting, as a correction value and based at least in part on rigid body estimation of the set of radar observations, one of the candidate values; determining, based at least in part on the correction value, a refined velocity of the object; and outputting the refined velocity of the object for processing by a vehicle computing device.

R: The method of paragraph Q, wherein: the refined velocity comprises a Doppler velocity, the radar data comprises a set of radar observations, and selecting one of the candidate values as the correction value based at least in part on applying the rigid body estimation to each radar observation in the set of radar observations.

S: The method of paragraph Q or R, further comprising: receiving a reference velocity representing one of: a vehicle velocity associated with a vehicle, an object velocity associated with the object, or a lidar velocity determined by a lidar sensor associated with the vehicle; and determining the candidate values based at least in part on the reference velocity.

T: The method of any of paragraphs Q-S, wherein the radar data comprises azimuth information, and further comprising: determining that the azimuth information meets or falls within an azimuth threshold; and determining the candidate values is further based at least in part on the azimuth information meeting or falling within the azimuth threshold.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the system to perform operations comprising:

receiving radar data associated with an object in an environment, wherein the radar data comprises azimuth information;

determining that the azimuth information associated with the radar data meets or exceeds an azimuth threshold, the azimuth threshold representing a predetermined value;

identifying a Doppler interval associated with the radar data;

determining elevation data of a data point associated with the object in the environment;

determining intensity data associated with the data point;

determining range data associated with the data point;

determining, based at least in part on the Doppler interval, the elevation data, the intensity data, the azimuth information meeting or exceeding the azimuth threshold, and the range data, candidate values for correcting an initial velocity estimate of the object associated with the radar data;

selecting, based at least in part on rigid body estimation of radar points associated with the radar data, one of the candidate values as a correction value for correcting the initial velocity estimate of the object;

determining, based at least in part on the correction value, a refined velocity of the object; and sending the refined velocity of the object to a vehicle computing device configured to control a vehicle in the environment.

2. The system of claim 1, wherein:

at least one of the candidate values is further determined based at least in part on applying an integer multiple to the Doppler interval and applying velocity offsets associated with the radar data.

3. The system of claim 1, the operations further comprising:

receiving a reference velocity representing one of: a vehicle velocity associated with the vehicle, an object velocity associated with the object, or a lidar velocity determined by a lidar sensor associated with the vehicle; and determining the candidate values based at least in part on the reference velocity.

4. The system of claim 1, wherein:

the radar data comprises a Doppler velocity associated with the object, the correction value represents a correction velocity, and the operations further comprise:

combining the Doppler velocity and the correction velocity; and determining the refined velocity of the object is further based at least in part on the combining.

5. The system of claim 1, wherein:

the radar data comprises yaw information associated with the object, wherein the yaw information is determined based at least in part on the rigid body estimation; and selecting the correction value is based at least in part on the yaw information.

6. One or more non-transitory computer-readable media storing instructions executable by a processor, wherein the instructions, when executed, cause the processor to perform operations comprising:

receiving radar data associated with an object in an environment, the radar data comprising Doppler interval information and azimuth information;

determining that the azimuth information associated with the radar data meets or exceeds an azimuth threshold, the azimuth threshold representing a pre-determined value;

determining elevation data of a data point associated with the object in the environment;

determining intensity data associated with the data point;

determining range data associated with the data point;

determining, based at least in part on the Doppler interval information, the elevation data, the intensity data, the range data, and the azimuth information meeting or exceeding the azimuth threshold, candidate values for correcting an initial velocity estimate of the object associated with the radar data;

selecting, based at least in part on a rigid body estimation, one of the candidate values as a correction value for correcting the initial velocity estimate of the object;

determining, based at least in part on the correction value, a refined velocity of the object; and outputting the refined velocity of the object for processing by a vehicle computing device.

7. The one or more non-transitory computer-readable media of claim 6, wherein:

the refined velocity comprises a Doppler velocity, the radar data comprises a set of radar observations, and selecting one of the candidate values as the correction value based at least in part on applying the rigid body estimation to a radar observation in the set of radar observations.

8. The one or more non-transitory computer-readable media of claim 6, wherein the radar data is received from a radar device, and the operations further comprising:

receiving sensor data from a sensor different from the radar device;

wherein determining the candidate values is further based at least in part on the sensor data.

9. The one or more non-transitory computer-readable media of claim 6, wherein:

the radar data comprises a Doppler velocity associated with the object, the correction value represents a correction velocity, and the operations further comprise:

modifying the Doppler velocity based at least in part on the correction velocity; and determining the refined velocity of the object based at least in part on the modifying the Doppler velocity.

10. The one or more non-transitory computer-readable media of claim 6, wherein:

determining yaw information associated with the object is based at least in part on the rigid body estimation, and selecting the correction value is based at least in part on the yaw information.

11. The one or more non-transitory computer-readable media of claim 6, wherein:

the Doppler interval information comprises a Doppler interval, and at least one of the candidate values is further determined based at least in part on applying an integer multiple to the Doppler interval and applying velocity offsets associated with the radar data.

12. The one or more non-transitory computer-readable media of claim 6, wherein the candidate values represent candidate velocities, and the operations further comprising:

determining a variance of velocities for a group of candidate velocities;

determining that the variance of velocities for the group of candidate velocities meets a variance threshold, wherein at least one of the candidate velocities is further determined based on determining that the variance of velocities for the group of candidate velocities meets the variance threshold.

13. The one or more non-transitory computer-readable media of claim 6, wherein the selecting is based at least in part on applying a rigid body estimation algorithm to a set of observations associated with the radar data.

14. The one or more non-transitory computer-readable media of claim 6, the operations further comprising:

sending the refined velocity to a prediction component associated with a vehicle; and causing the prediction component to determine an object trajectory associated with the object based at least in part on the refined velocity, and controlling the vehicle in the environment relative to the object based at least in part on the object trajectory.

15. A method comprising:

receiving radar data associated with an object in an environment, the radar data comprising Doppler interval information and azimuth information;

determining that the azimuth information associated with the radar data meets or exceeds an azimuth threshold, the azimuth threshold representing a pre-determined value;

determining elevation data of a data point associated with the object in the environment;

determining intensity data associated with the data point;

determining range data associated with the data point;

determining, based at least in part on the Doppler interval information, the elevation data, the intensity data, the range data, and the azimuth information meeting or exceeding the azimuth threshold, candidate values for correcting an initial velocity estimate of the object associated with the radar data;

selecting, based at least in part on a rigid body estimation, one of the candidate values as a correction value for correcting the initial velocity estimate of the object;

determining, based at least in part on the correction value, a refined velocity of the object; and outputting the refined velocity of the object for processing by a vehicle computing device.

16. The method of claim 15, further comprising:

determining a Doppler velocity, wherein the refined velocity of the object is further determined based at least in part on the Doppler velocity.

17. The method of claim 15, further comprising:

receiving a reference velocity representing one of: a vehicle velocity associated with a vehicle, an object velocity associated with the object, or a lidar velocity determined by a lidar sensor associated with the vehicle; and determining the candidate values based at least in part on the reference velocity.

18. The method of claim 17, the method further comprises:

determining a relative velocity based at least in part on a vehicle velocity associated with a vehicle and the initial velocity estimate associated with the object, wherein determining the refined velocity of the object is further based at least in part on the relative velocity.

19. The method of claim 15, wherein the selecting is based at least in part on applying a rigid body estimation algorithm to a set of observations associated with the radar data.

20. The method of claim 15, wherein the radar data is received from a radar device, and the method further comprising:

receiving sensor data from a sensor different from the radar device;

wherein determining the candidate values is further based at least in part on the sensor data.

21. The method of claim 15, wherein the Doppler interval information comprises a Doppler interval, and at least one of the candidate values is further determined based at least in part on applying an integer multiple to the Doppler interval and applying velocity offsets associated with the radar data.

* * * * *